(12) United States Patent
Sakai et al.

(10) Patent No.: US 11,215,788 B2
(45) Date of Patent: **\*Jan. 4, 2022**

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Hiroshi Sakai, Kanagawa (JP); Yutaka Watanabe, Kanagawa (JP); Gyokubu Cho, Kanagawa (JP)

(73) Assignee: MITUTOYO CORPORATION, Kanagawa (JP)

( \* ) Notice: Subject to any disclaimer, the term of this patent is extended or adjusted under 35 U.S.C. 154(b) by 190 days.

This patent is subject to a terminal disclaimer.

(21) Appl. No.: 16/415,190

(22) Filed: May 17, 2019

(65) Prior Publication Data

US 2019/0353872 A1 Nov. 21, 2019

(30) Foreign Application Priority Data

May 21, 2018 (JP) .............................. JP2018-097266

(51) Int. Cl.
*G02B 15/14* (2006.01)
*G02B 7/10* (2021.01)
*G02B 21/24* (2006.01)
*H04N 5/225* (2006.01)

(52) U.S. Cl.
CPC ............. *G02B 7/10* (2013.01); *G02B 21/245* (2013.01); *H04N 5/2254* (2013.01)

(58) Field of Classification Search
CPC . G02B 3/14; G02B 7/10; G02B 7/105; G02B 7/102; G02B 21/245; G02B 21/0016; G02B 21/244; G02F 1/29; G02F 1/294; H04N 5/2254
USPC .................................. 359/694–706, 822–830
See application file for complete search history.

(56) References Cited

U.S. PATENT DOCUMENTS

| 2010/0177376 | A1 | 7/2010 | Arnold et al. |
| 2017/0013185 | A1\* | 1/2017 | Gladnick ........... H04N 5/23296 |
| 2017/0324895 | A1\* | 11/2017 | Bryll .................... H04N 5/2353 |
| 2018/0314033 | A1 | 11/2018 | Sakai et al. |

(Continued)

OTHER PUBLICATIONS

U.S. Appl. No. 16/415,306 to Yutaka Watanabe et al., filed May 17, 2019.

(Continued)

*Primary Examiner* — Mahidere S Sahle
(74) *Attorney, Agent, or Firm* — Greenblum & Bernstein, P.L.C.

(57) ABSTRACT

A variable focal length lens device includes: a lens system whose refractive index changes in accordance with a drive signal to be inputted; an objective lens disposed on the same optical axis as the lens system; an image detector configured to detect an image of a measurement target through the lens system and the objective lens: a resonance-lock controller configured to tune the drive signal to a resonance frequency of the lens system; and a resonance-lock delay controller configured to divide a change in a frequency of the drive signal by a change amount set by the resonance-lock controller to step-by-step changes for n times by a preset reference value to delay the change in the frequency of the drive signal.

6 Claims, 14 Drawing Sheets

(56) References Cited

U.S. PATENT DOCUMENTS

2018/0314041 A1    11/2018  Igasaki et al.
2018/0314042 A1    11/2018  Igasaki et al.
2020/0073024 A1*    3/2020  Igasaki .............. G02B 21/0016

OTHER PUBLICATIONS

U.S. Appl. No. 16/414,148 to Hiroshi Sakai et al., filed May 16, 2019.

* cited by examiner

VARIABLE FOCAL LENGTH LENS DEVICE AND VARIABLE FOCAL LENGTH LENS CONTROL METHOD

The entire disclosure of Japanese Patent Application No. 2018-097266 filed May 21, 2018 is expressly incorporated by reference herein.

TECHNICAL FIELD

The present invention relates to a variable focal length lens device and a variable focal length lens control method.

BACKGROUND ART

A variable focal length lens device employing, for instance, a liquid lens system (simply referred to as a "lens system" hereinafter) based on a principle disclosed in Patent Literature 1 (U.S. Patent Application Publication No. 2010/0177376) has been developed.

The lens system includes a cylindrical oscillator made of a piezoelectric material that is immersed in a transparent liquid. When an alternating-current (AC) voltage is applied to an inner circumferential surface and an outer circumferential surface of the oscillator of the lens system, the oscillator expands and contracts in a thickness direction thereof to oscillate the liquid inside the oscillator. Then, when the frequency of the applied AC voltage is tuned to an intrinsic frequency of the liquid, a concentric standing wave is created in the liquid to form concentric regions of different refractive indexes around a center axis of the oscillator. Accordingly, when light is introduced into the oscillator of the lens system along the center axis of the oscillator, the light follows a diffusing or converging path according to the refractive index of each of the concentric regions.

The variable focal length lens device includes the above-described lens system and a focusing objective lens (e.g. a typical convex lens or lens group), which are disposed on a common optical axis.

When a parallel light enters a typical objective lens, the light having passed through the lens is focused at a focus position located at a predetermined focal length from the lens. In contrast, when a parallel light enters the lens system disposed coaxially with the objective lens, the light is diverged or converged by the lens system, so that the light having passed through the objective lens is focused at a position closer or farther than the original focus position (i.e. the focus position without the lens system).

Accordingly, an amplitude of a drive signal (an AC voltage of a frequency forming a standing wave in the liquid inside the lens system) inputted to the lens system is increased or decreased in the variable focal length lens device, thereby controlling the focus position of the variable focal length lens device as desired within a predetermined range (i.e. a range with a predetermined variation width capable of being added to/subtracted from the focal length of the objective lens using the lens system).

A sinusoidal AC signal is exemplarily used for the drive signal inputted to the lens system of the variable focal length lens device. When such a sinusoidal drive signal is inputted, the focal length (focus position) of the variable focal length lens device sinusoidally changes. At this time, when the amplitude of the drive signal is 0, the light passing through the lens system is not refracted and the focal length of the variable focal length lens device becomes equal to the focal length of the objective lens. When the amplitude of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sine wave of the drive signal to perform a pulsed illumination. Such pulsed illumination on an object at a predetermined focal length among the sinusoidally changing focal lengths allows for detection of the image of the object at the focal length. When the pulsed illumination is performed at a plurality of phases in one cycle and images are detected at timings corresponding to the phases, the images at a plurality of focal lengths can be simultaneously obtained.

In the variable focal length lens device, a temperature of the liquid inside the above-described lens system and a temperature of the oscillator change by being affected by an ambient temperature, a heat generated accompanying the operation of the lens system, and the like. An intrinsic frequency also changes due to the temperature change, resulting in a change in a frequency (resonance frequency) of the AC signal forming the standing wave. If the drive signal inputted to the lens system remains the same as the drive signal before the temperature change, the drive signal is deviated from a peak of the resonance frequency, thus failing to efficiently form the standing wave.

A resonance-lock system, which allows the drive signal to be automatically tuned to the changed resonance frequency, has thus been used. For instance, it is supposed that a drive signal of a predetermined frequency, at which an intensity level of the standing wave is maximized, is inputted to the lens system. If the level of the standing wave is declined, it is determined that the frequency of the drive signal is deviated from the peak of the resonance capable of forming the standing wave in the lens system, and the frequency of the drive signal is tuned to a new peak position by raising or lowering the frequency of the drive signal. When the frequency of the drive signal reaches the new peak position, the level of the standing wave can be restored to the maximum intensity. Such tuning to the peak position is continuously conducted to achieve the automatic tuning (resonance lock) to the resonance frequency, at which the standing wave is created.

In the above-described variable focal length lens device, the standing wave can be always efficiently obtained by automatically tuning (resonance lock) the drive signal to the resonance frequency at which the standing wave is created. The above automatic tuning to the frequency is conducted by monitoring the resonance frequency returned from the lens system at a predetermined cycle and resetting the frequency of the drive signal at every cycle.

However, in the variable focal length lens device provided with the resonance lock, for instance, when a large change in the frequency is caused by the resonance lock during an image measurement, a timing at which the same focal length is obtained is temporarily changed to reduce an acquired image resolution. In addition, when a user visually observes an image during the image measurement, the image sometimes becomes unstable (e.g., flickering in screen), resulting in a deterioration of observability.

SUMMARY OF INVENTION

An object of the invention is to provide a variable focal length lens device and a variable focal length lens method that are capable of efficiently creating a standing wave and obtaining a stable image with a high resolution.

According to an aspect of the invention, a variable focal length lens device includes: a lens system whose refractive index changes in response to a drive signal to be inputted; an objective lens disposed on the same optical axis as the lens system; an image detector configured to detect an image of a measurement target through the lens system and the objective lens; a resonance-lock controller configured to tune a frequency of the drive signal to a resonance frequency of the lens system; and a resonance-lock delay controller configured to delay a change in the frequency of the drive signal by the resonance-lock controller.

In the above aspect of the invention, the resonance-lock delay controller is configured to delay a change in the frequency (occasionally referred to as "frequency change") of the drive signal controlled by the resonance-lock controller. In other words, a device of prolonging a duration from a start to an end of the frequency change is usable as the resonance-lock delay controller. Specifically, the resonance-lock delay controller is exemplified by a device of dividing a change amount of the frequency of the resonance lock into a plurality of change amounts and change the change amount step-by-step at minute time intervals. The change amount of the frequency of the resonance lock may continuously be changed over a predetermined period of time.

In the aspect of the invention, a device of executing an existing resonance lock operation is usable as the resonance-lock controller.

In the aspect of the invention, the resonance-lock controller allows the drive signal to be automatically tuned to a peak of a current resonance frequency in the lens system and efficiently create the standing wave.

At the execution of the resonance lock operation, the resonance-lock delay controller delays the automatic tuning operated by the resonance-lock controller, in other words, delays the tuning operation to the resonance frequency, whereby the change in the frequency of the drive signal is made slow. As a result, even when the frequency change by the resonance-lock is large, an actually executed frequency change is made slow, which enables to prevent an inconsistency of image acquiring timings, image flickering in screen, and the like occurring at a large frequency change, so that a high-resolution image can be acquired.

In the variable focal length lens device according to the above aspect, it is preferable that the resonance-lock delay controller includes a predetermined reference value that is set in advance and is configured to sequentially execute a plurality of frequency changes by the reference value at a predetermined time interval until the plurality of frequency changes reaches a frequency change of the drive signal controlled by the resonance-lock controller.

In the above arrangement, even at a large frequency change of the drive signal operated by the resonance-lock controller, an actually executed frequency change of the drive signal is step-by-step changes by a reference value. Accordingly, the inconsistency of the image acquiring timings, the image flickering in screen, and the like can reliably be prevented by setting the reference value in accordance with the change amount falling within the range in which the inconsistency of image acquiring timings, image flickering in screen, and the like can be prevented.

In the variable focal length lens device according to the above aspect, it is preferable that the resonance-lock delay controller includes a number of dividing times that is set in advance and is configured to divide the frequency change of the drive signal controlled by the resonance-lock controller by the number of dividing times, and sequentially execute the plurality of frequency changes by the divided frequency change of the drive signal at a predetermined time interval.

In the above arrangement, even at a large frequency change of the drive signal operated by the resonance-lock controller, an actually executed frequency change of the drive signal is the step-by-step changes by the number of the dividing times, and a change amount each at the time of change is made smaller than an entire change in the frequency of the original drive signal. Accordingly, the inconsistency of the image acquiring timings, the image flickering in screen, and the like can reliably be prevented.

Further, since the number of the step-by-step changes made at a predetermined time interval is restricted by the number of the dividing times that is set in advance, even when the change amount of the entire frequency change of the drive signal is large, prolongation of the time until the end of frequency change of the drive signal can be prevented.

According to another aspect of the invention, a variable focal length lens control method using a variable focal length lens device including: a lens system whose refractive index changes in response to a drive signal to be inputted; an objective lens disposed on the same optical axis as the lens system; an image detector configured to detect an image of a measurement target through the lens system and the objective lens; and a resonance-lock controller configured to tune a frequency of the drive signal to a resonance frequency of the lens system, includes converting a change in the frequency of the drive signal by the resonance-lock controller to a plurality of step-by-step changes.

In the above aspect of the invention, since the plurality of step-by-step changes are conducted at the resonance lock operation by the resonance-lock controller, a frequency change of the drive signal by the resonance-lock controller can be delayed, so that the same advantages as described above regarding the variable focal length lens device according to above aspect of the invention can be obtained.

The aspects of the invention can provide a variable focal length lens device and a variable focal length lens control method that are capable of efficiently creating a standing wave and obtaining a stable image with a high resolution.

BRIEF DESCRIPTION OF DRAWING(S)

FIG. 1 schematically shows an exemplary embodiment of the invention.

FIG. 2 schematically shows a structure of a lens system in the exemplary embodiment.

FIG. 3 schematically shows oscillation states of the lens system in the exemplary embodiment.

FIG. 4 schematically shows a focal length of the lens system in the exemplary embodiment.

DESCRIPTION OF EMBODIMENT(S)

An exemplary embodiment of the invention will be described below with reference to the attached drawings.

Variable Focal Length Lens Device 1

Figure 1:
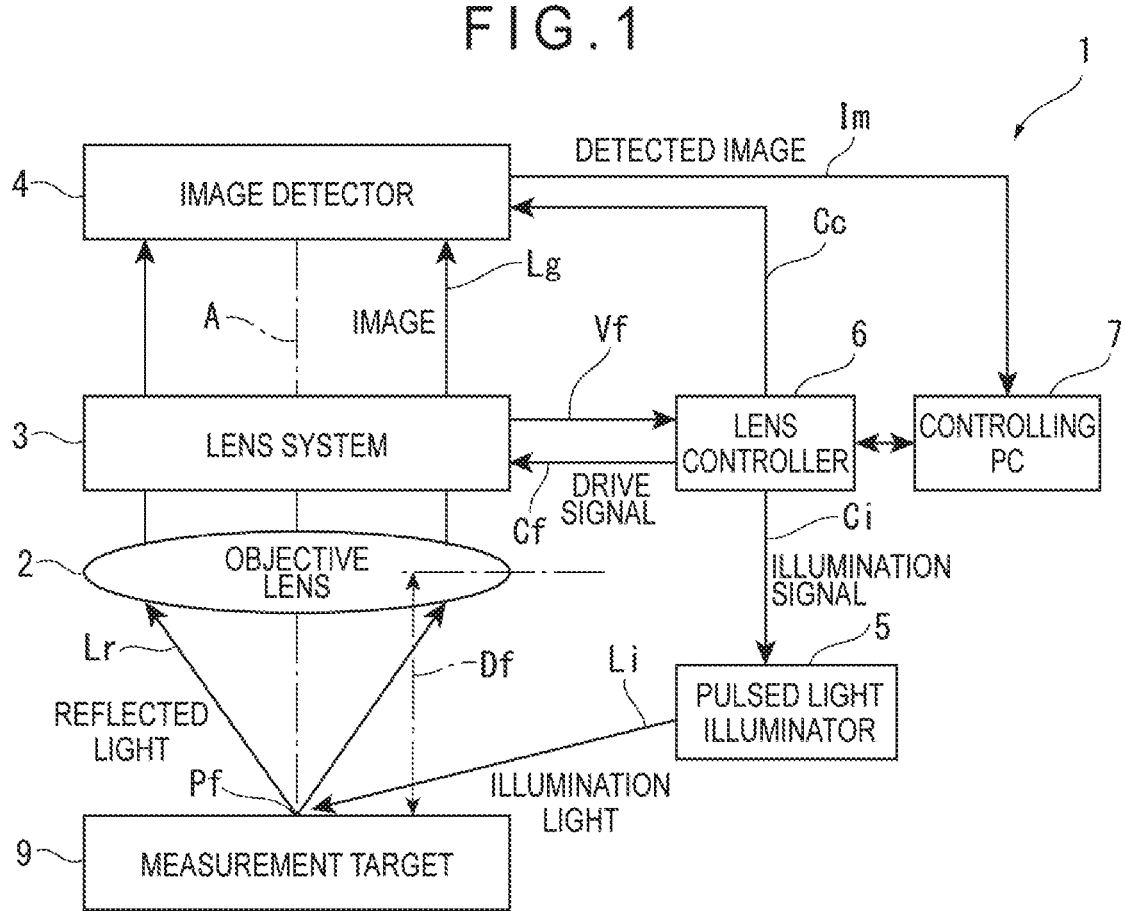

As shown in FIG. 1, a variable focal length lens device 1 is configured to detect an image of a surface of a measurement target 9 while varying a focal length, and includes an objective lens 2, a lens system 3 and an image detector 4 which are disposed on a common optical axis A intersecting with the surface of the measurement target 9.

The variable focal length lens device 1 further includes: a pulsed light illuminator 5 configured to apply pulsed illumination on the surface of the measurement target 9; a lens controller 6 configured to control operations of the lens system 3 and the pulsed light illuminator 5; and a controlling PC 7 configured to operate the lens controller 6.

An existing personal computer is used as the controlling PC 7. The desired function of the controlling PC 7 is achieved by running a predetermined control software on the controlling PC 7.

The controlling PC 7 is also configured to capture and process an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controlling PC 7 in a form of a detected image Im of a predetermined format.

The pulsed light illuminator 5 includes a light-emitting element such as a light emitting diode (LED). The pulsed light illuminator 5 is configured to emit an illumination light Li only for a predetermined time to apply the pulsed illumination on the surface of the measurement target 9 when an illumination signal Ci is inputted from the lens controller 6. The illumination light Li is reflected at the surface of the measurement target 9. A reflected light Lr from the surface of the measurement target 9 forms the image Lg through the objective lens 2 and the lens system 3.

The lens system 3 is configured to change a refractive index thereof in response to a drive signal Cf inputted by the lens controller 6. The drive signal Cf is a sinusoidal AC signal of a frequency capable of forming a standing wave in the lens system 3.

A focal length Df to a focus position Pf of the variable focal length lens device 1 can be changed as desired based on a focal length of the objective lens 2 by changing the refractive index of the lens system 3.

Lens System 3

Figure 2:
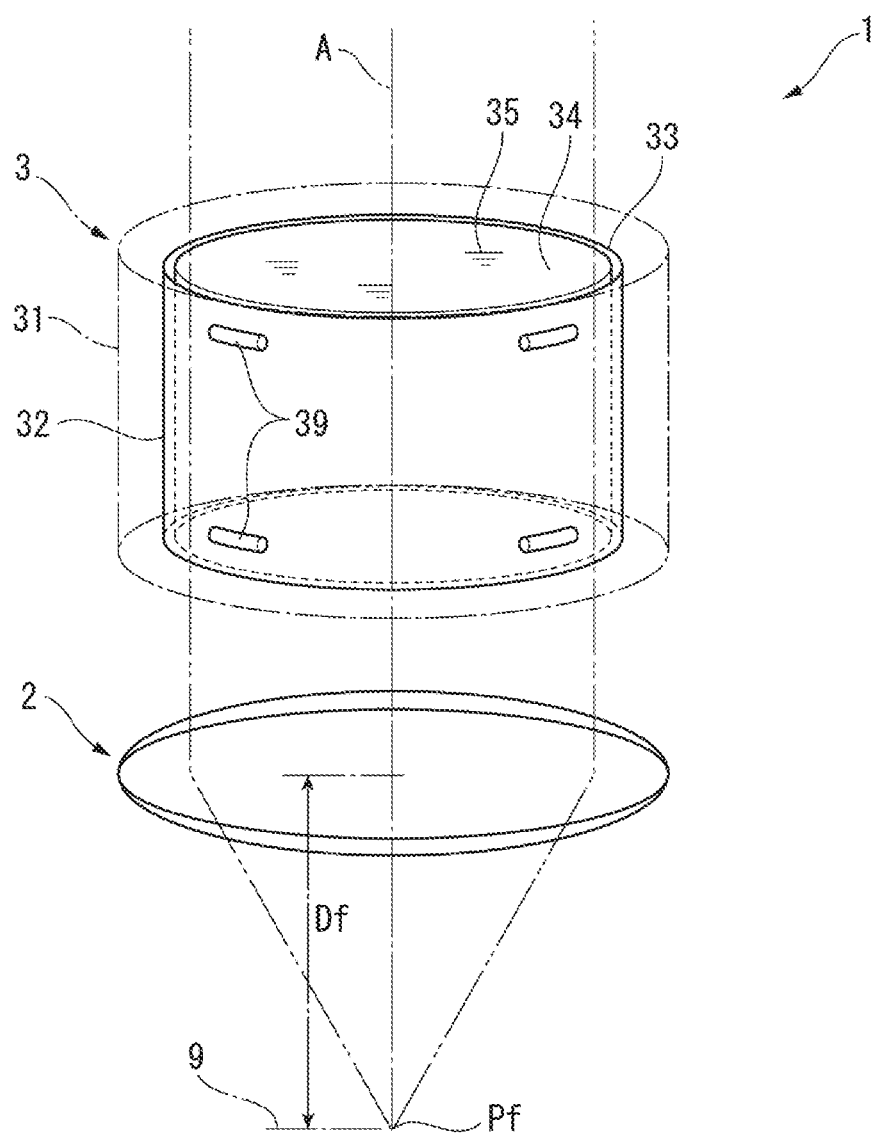

As shown in FIG. 2, the lens system 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

An interior of the case 31 is filled with a highly transparent liquid 35. The oscillator 32 is entirely immersed in the liquid 35 and an interior of the cylindrical oscillator 32 is filled with the liquid 35. The frequency of the AC voltage of the drive signal Cf is tuned to a frequency capable of forming a standing wave in the liquid 35 inside the oscillator 32.

Figure 3:
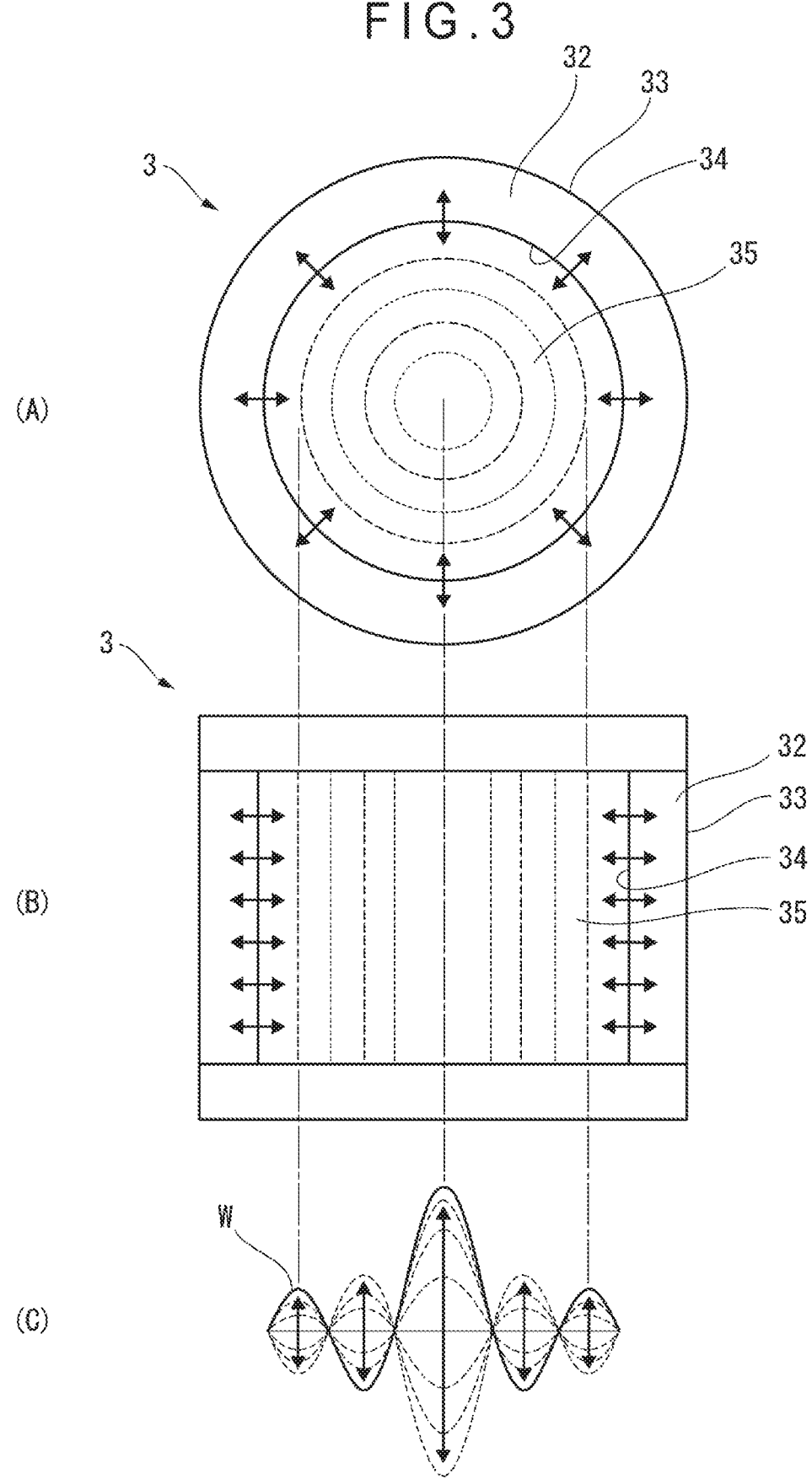

As shown in FIG. 3, when the oscillator 32 of the lens system 3 is oscillated, a standing wave is formed in the liquid 35 to create concentric regions with alternating refractive indexes (see FIGS. 3(A) and 3(B)).

A relationship between a distance (radius) from a central axis of the lens system 3 and the refractive index of the liquid 35 at this time is represented by a refractive index distribution W shown in FIG. 3(C).

Figure 4:
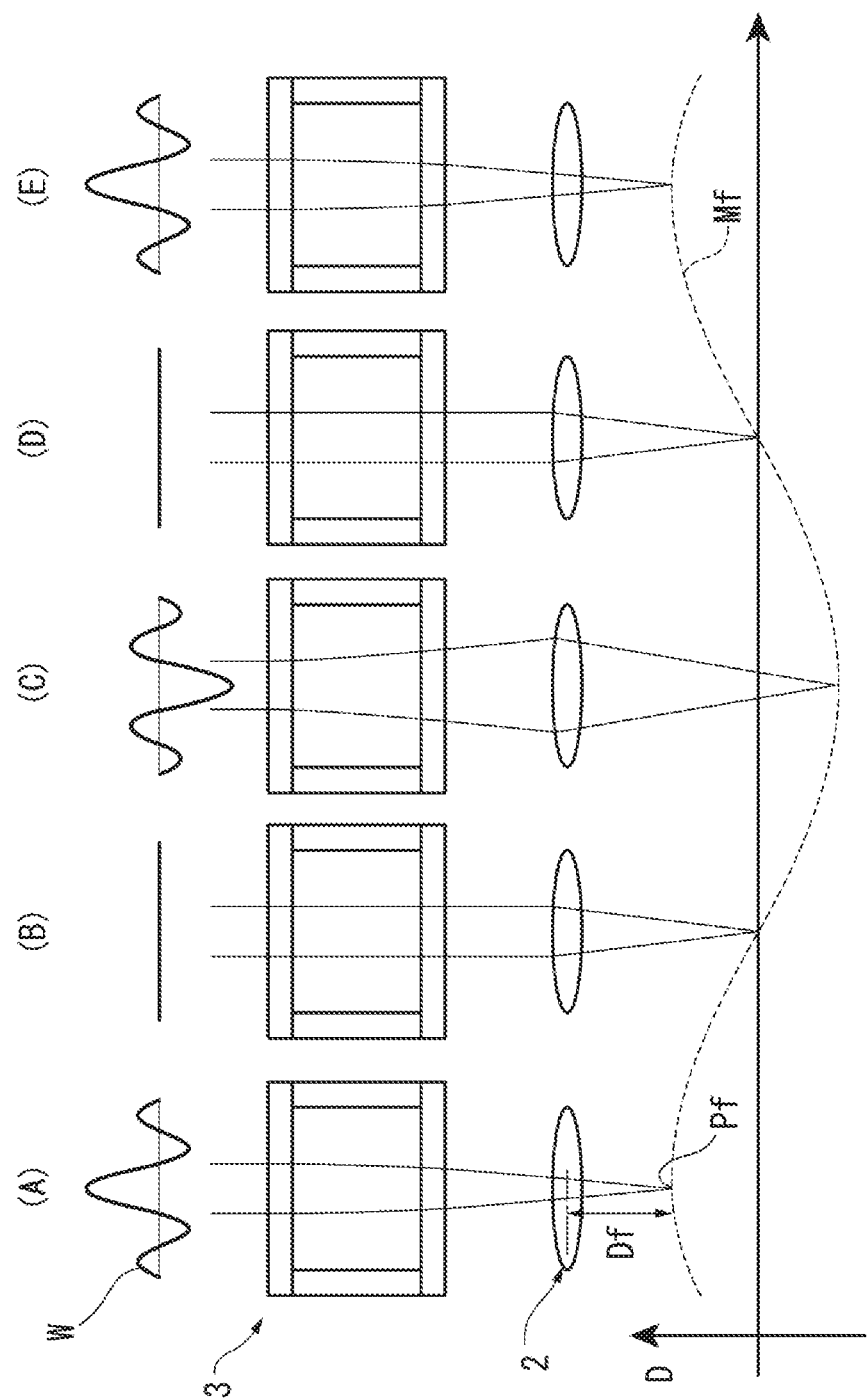

As shown in FIG. 4, since the drive signal Cf is a sinusoidal AC signal, a variation width of the refractive index distribution W of the liquid 35 in the lens system 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the lens system 3 converges the light passing therethrough, the focus position Pf is located close to the lens system 3 and the focal length Df is shortest.

The refractive index distribution W is flat in the state shown in FIG. 4(B), where the lens system 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the lens system 3 diffuses the light passing therethrough, the focus position Pf is located remote from the lens system 3 and the focal length Df is largest.

The refractive index distribution W is again flat in the state shown in FIG. 4(D), where the lens system 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focal-point-variation waveform Mf in FIG. 4.

By applying the pulsed illumination on the measurement target 9 at any of the focus positions Pf in the focal-point-variation waveform Mf and detecting an image illuminated at this time, the image of the illuminated target object at the focus position Pf at a desired focal length Df can be obtained.

Lens Controller 6

Referring back to FIG. 1, the oscillation of the lens system 3, the illumination of the pulsed light illuminator 5 and the image-detection of the image detector 4 of the variable focal length lens device 1 are controlled based on the drive signal Cf, the illumination signal Ci and an image-detection signal Cc from the lens controller 6. The controlling PC 7 is connected in order to, for instance, configure the setting of the lens controller 6 that controls the above components.

Figure 5:
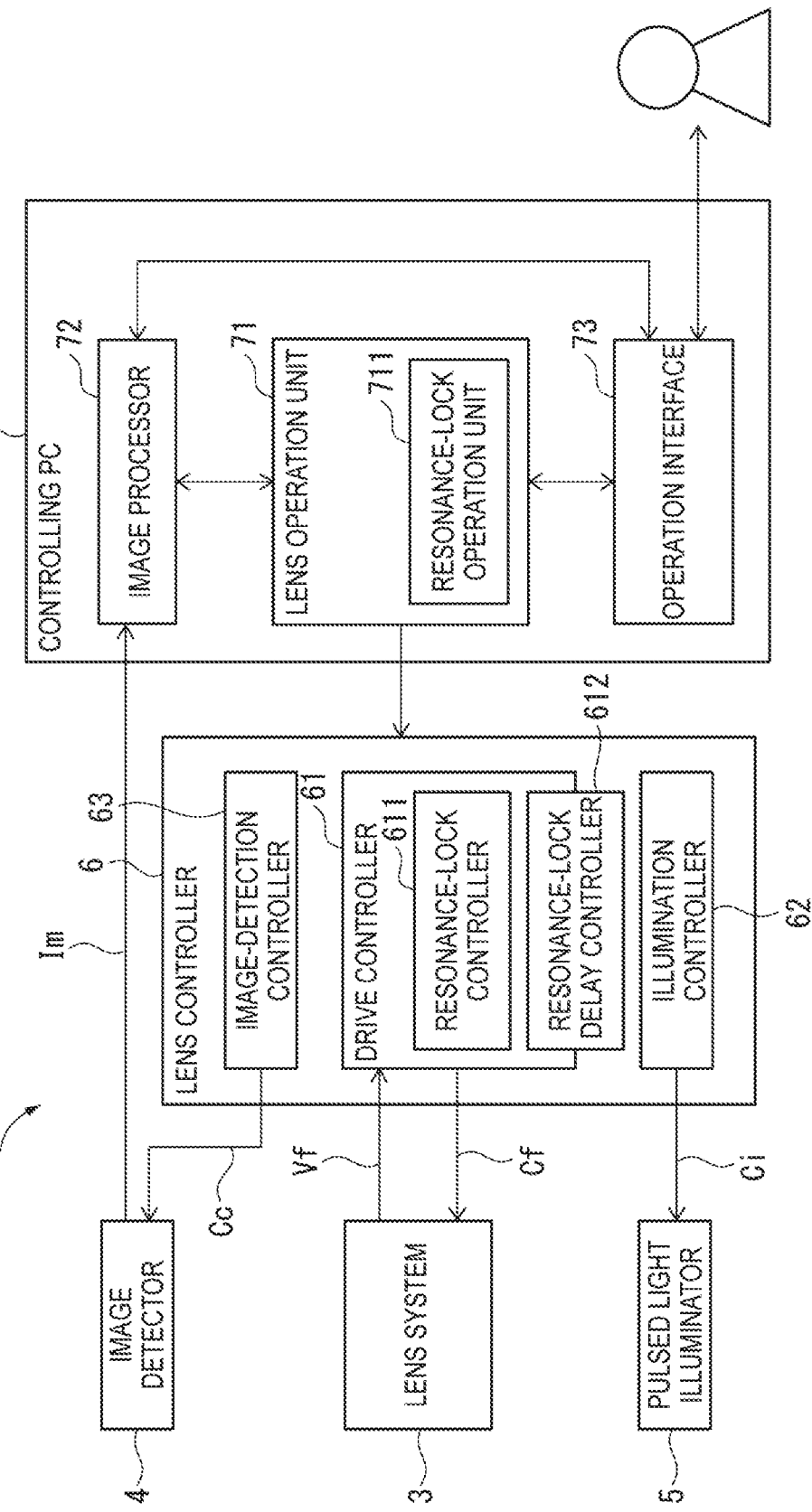
FIG. 5 is a block diagram showing a relevant part in the exemplary embodiment.

As shown in FIG. 5, the lens controller 6 includes: a drive controller 61 configured to output the drive signal Cf to the lens system 3; an illumination controller 62 configured to output the illumination signal Ci to the pulsed light illuminator 5; and an image-detection controller 63 configured to output the image-detection signal Cc to the image detector 4.

The drive controller 61 includes a resonance-lock controller 611 and a resonance-lock delay controller 612.

The resonance-lock controller 611 is configured to detect oscillation states Vf of the lens system 3 based on an effective power or a drive current applied to the lens system 3 when the lens system 3 is oscillated in response to the inputted drive signal Cf. The resonance-lock controller 611 tunes the frequency of the drive signal Cf with reference to the oscillation states Vf of the lens system 3 to allow the frequency of the drive signal Cf to be locked to a current resonance frequency of the lens system 3. It should be noted that the oscillation states Vf may be detected by an oscillation sensor disposed in the lens system 3.

Figure 6:
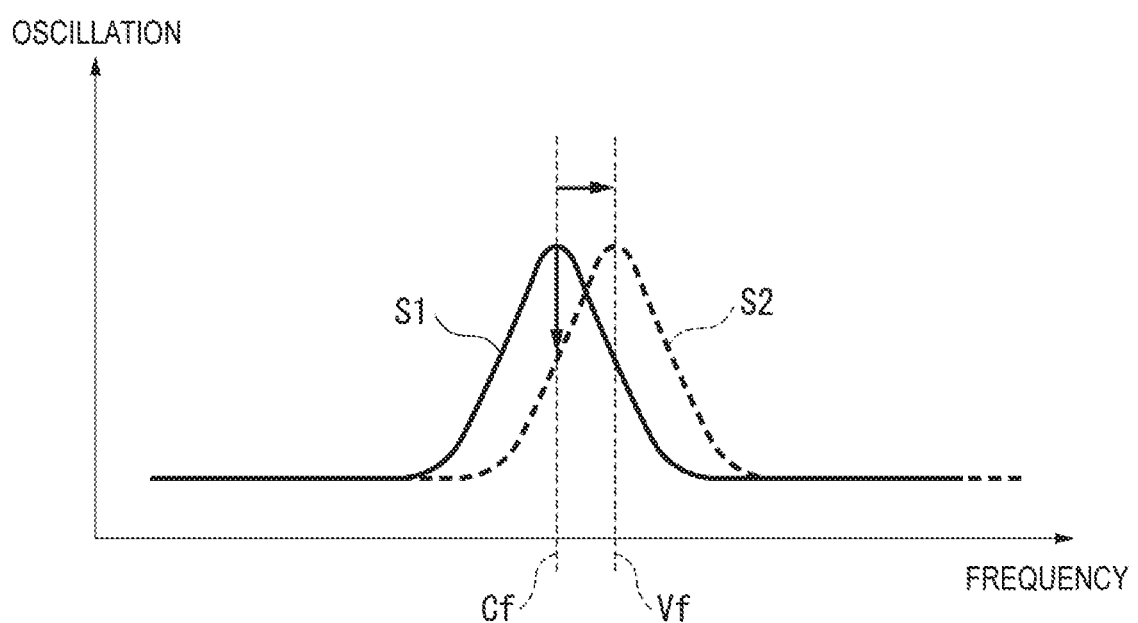
FIG. 6 is a graph showing a change in a resonance frequency in the exemplary embodiment.

Assuming that the oscillation characteristics of the lens system 3 are represented by S1 in FIG. 6, the drive signal Cf is set at the peak of the oscillation characteristics S1. In the absence of any temperature change and the like in the lens system 3, the frequency at the peak position of the oscillation characteristics of the lens system 3 detected by the resonance-lock controller 611 stays at the frequency at the peak of the oscillation characteristics S1 of the drive signal Cf.

With regard to the above, it is supposed that the oscillation characteristics of the lens system 3 are changed to oscillation characteristics S2 due to the temperature change and the like.

Then, the oscillation characteristics of the lens system 3 detected by the resonance-lock controller 611 show a different peak (i.e. the peak of the oscillation characteristics S2), which is shifted from the peak of the drive signal Cf. If the drive signal Cf is inputted to the lens system 3 having the oscillation characteristics S2, the frequency of the drive signal Cf, which does not match the peak position of the oscillation characteristics S2, cannot provide sufficient effective power to the lens system 3, thereby decreasing the efficiency.

Figure 7:
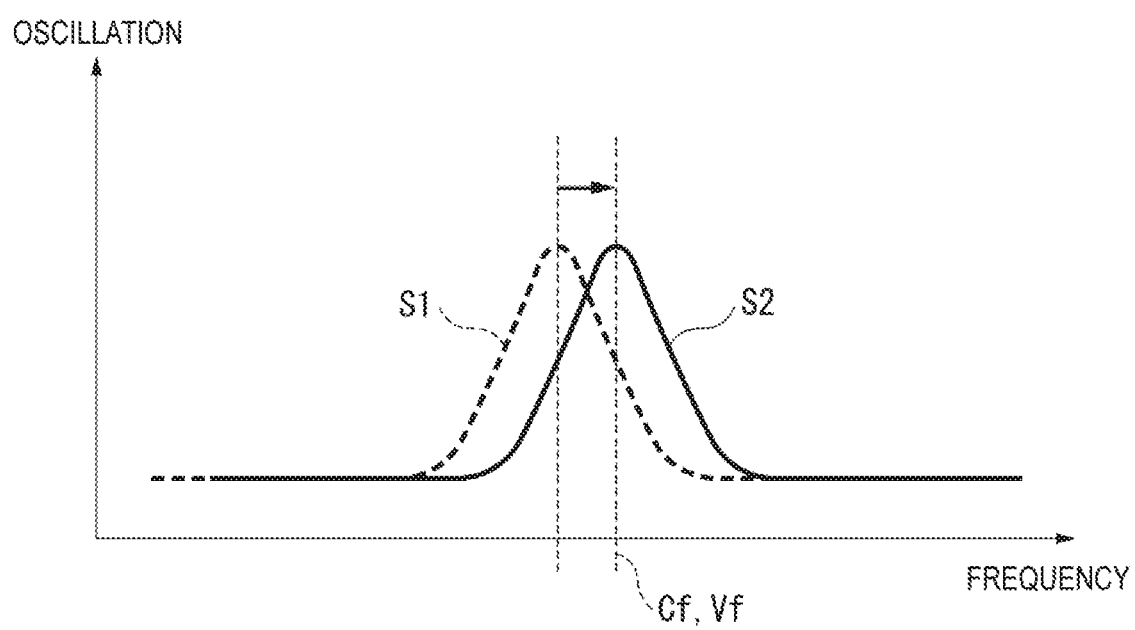
FIG. 7 is a graph showing a resonance lock function in the exemplary embodiment.

As shown in FIG. 7, upon detecting a deviation between the detected oscillation states Vf of the lens system 3 and the drive signal Cf inputted from the drive controller 61 to the lens system 3, the resonance-lock controller 611 searches for and captures the current peak position of the lens system 3, and changes the frequency of the drive signal Cf outputted from the drive controller 61 to the frequency at the current peak position.

Consequently, the frequency of the drive signal Cf inputted from the drive controller 61 to the lens system 3 is tuned to the peak of the resonance frequency of the current oscillation characteristics S2 of the lens system 3, thereby automatically tuning the frequency of the drive signal Cf to the resonance frequency.

Referring back to FIG. 5, in the drive controller 61, the drive signal Cf controlled by the resonance-lock controller 611 is subjected to a delay processing of a frequency change by the resonance-lock delay controller 612 before the drive signal Cf is outputted to the lens system 3.

The resonance-lock delay controller 612 converts the frequency change of the drive signal Cf, to which the resonance-lock controller 611 applies automatic tuning, to step-by-step changes each having a smaller change amount, and conducts the small step-by-step changes at minute time intervals, thereby delaying the frequency change of the drive signal Cf.

The delay processing with use of the step-by-step changes to be operated by the resonance-lock delay controller 612 will be described in detail later.

Controlling PC 7

The controlling PC 7 includes: a lens operation unit 71 configured to operate the lens controller 6 (e.g. to configure the setting of the lens controller 6); an image processor 72 configured to capture and process the detected image Im from the image detector 4; and an operation interface 73 configured to receive a user's operation on the variable focal length lens device 1.

The lens operation unit 71 includes a resonance-lock operation unit 711. The resonance-lock operation unit 711 can select an unlock mode and a lock-on mode. The user can switch between the unlock mode and the lock-on mode using the operation interface 73.

When the resonance-lock operation unit 711 selects the lock-on mode, the resonance-lock controller 611 becomes enabled to conduct the automatic tuning to the resonance frequency.

On the other hand, when the resonance-lock operation unit 711 selects the unlock mode, the resonance-lock controller 611 becomes disabled, so that the automatic tuning to the resonance frequency is not conducted. In this state, a high-resolution image can be acquired under a constant resonance frequency.

Resonance Lock Operation

Next, with reference to FIGS. 8 to 12, a resonance lock in the exemplary embodiment will be described.

In the exemplary embodiment, the drive controller 61 of the lens controller 6 drives the lens system 3 by the drive signal Cf while detecting the oscillation states Vf of the lens system 3. When the lens operation unit 71 selects the lock-on mode, the drive controller 61 conducts the resonance lock operation.

In the resonance lock operation, the resonance-lock controller 611 refers to the oscillation states Vf each at a predetermined period and changes the frequency of the drive signal Cf so as to be tuned to the resonance frequency. At this time, the resonance-lock delay controller 612 delays the frequency change of the drive signal Cf whose frequency has been changed by the resonance-lock controller 611.

Figure 8:
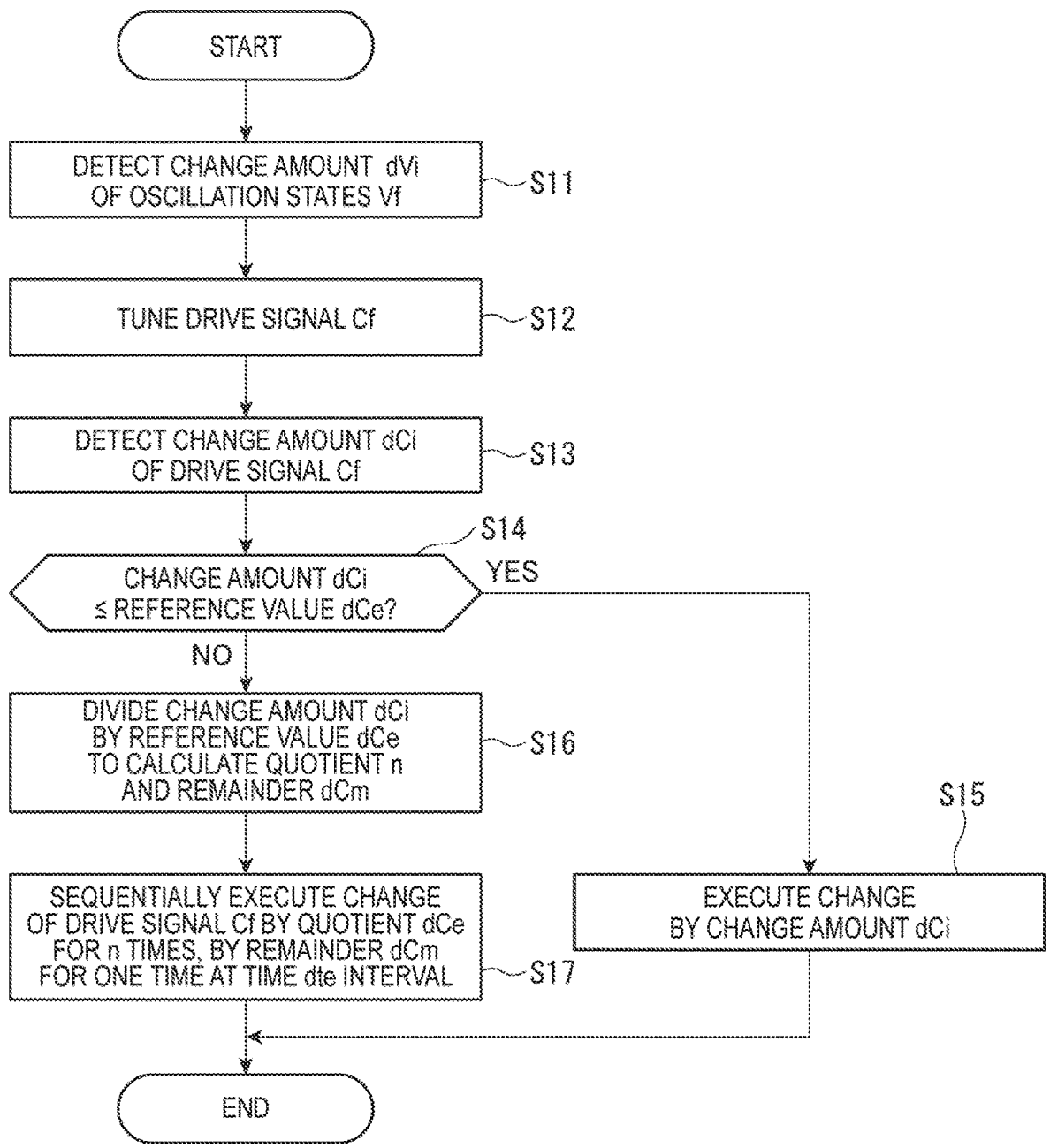
FIG. 8 is a flowchart showing a resonance lock operation in the exemplary embodiment.
Figure 9:
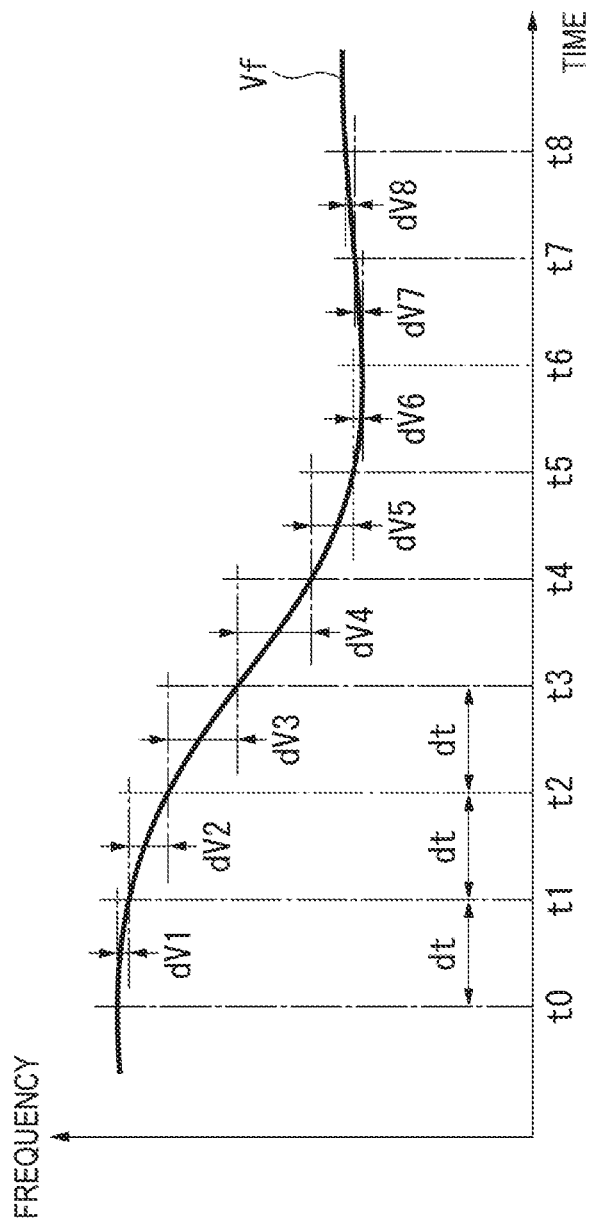
FIG. 9 is a graph showing a detection of the change in the resonance frequency in the resonance lock operation in the exemplary embodiment.

Specifically, a processing shown in FIG. 8 is conducted at a predetermined time interval (each at timings t1, t2, t3 and so on in FIG. 9).

As shown in FIG. 8, the resonance-lock controller 611 refers to the oscillation states Vf and detects a change amount dVi (Step S11), and tunes the drive signal Cf to the resonance frequency (Step S12).

In the oscillation states Vf as shown in FIG. 9, change amounts dV1, dV2, dV3 and so on having gained at the timings t1, t2, t3 and so on from the respective previous timings can be detected. Among the change amounts, the change amounts dV1, dV6 to dV8 are relatively small values, whereas the change amounts dV2 to dV5 at the timings t2 to t5 with a large inclination of the oscillation states Vf are relatively large values.

Figure 10:
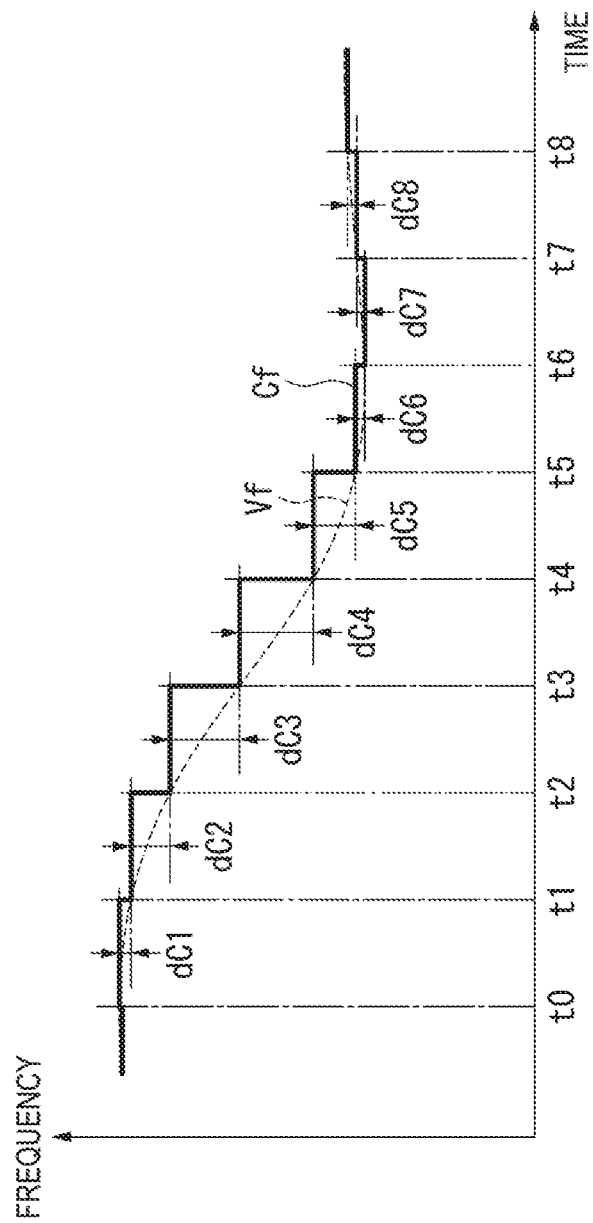
FIG. 10 is a graph showing a tuning to a frequency in a resonance-lock controller in the exemplary embodiment.

As shown in FIG. 10, the drive signal Cf to be automatically tuned is provided by a step-by-step signal whose change amounts dC1 to dC8 at the respective timings t1 to t8 correspond to the change amounts dV1 to dV8 of the oscillation states Vf at the respective timings t1 to t8. The change amounts dC2 to dC5 of the drive signal Cf at the respective timings t2 to t5 are relatively large in line with the inclination of the oscillation states Vf.

Referring back to FIG. 8, after the resonance-lock controller 611 tunes the drive signal Cf to the resonance frequency (Step S12), the resonance-lock delay controller 612 detects a change amount dCi of the drive signal Cf set by the resonance-lock controller 611 (Step S13).

The resonance-lock delay controller 612 judges, based on a preset reference value dCe, whether the change amount dCi set by the resonance-lock controller 611 is equal to or smaller than the reference value dCe (dCi≤dCe) (Step S14).

When the change amount dCi is equal to or smaller than the reference value dCe, the resonance-lock delay controller 612 sets the change of the drive signal Cf at a timing ti to be executed by exactly the change amount dCi set by the resonance-lock controller 611 (Step S15).

When the change amount dCi is more than the reference value dCe, the resonance-lock delay controller 612 sets the change of the drive signal Cf at the timing ti to be a step-by-step change based on the reference value dCe.

Specifically, the change amount dCi set by the resonance-lock controller 611 is divided by the reference value dCe to calculate a quotient n and a remainder dCm (Step S16). At this time, dCi=n×dCe+dCm.

Next, the change of the drive signal Cf at the timing ti is set to be sequentially executed by the reference value dCe for n times and by the remainder dCm for one time each at a time dte interval (Step S17). It should be noted that the time dte is a sufficiently small value relative to a predetermined time for executing the resonance lock operation.

Figure 11:
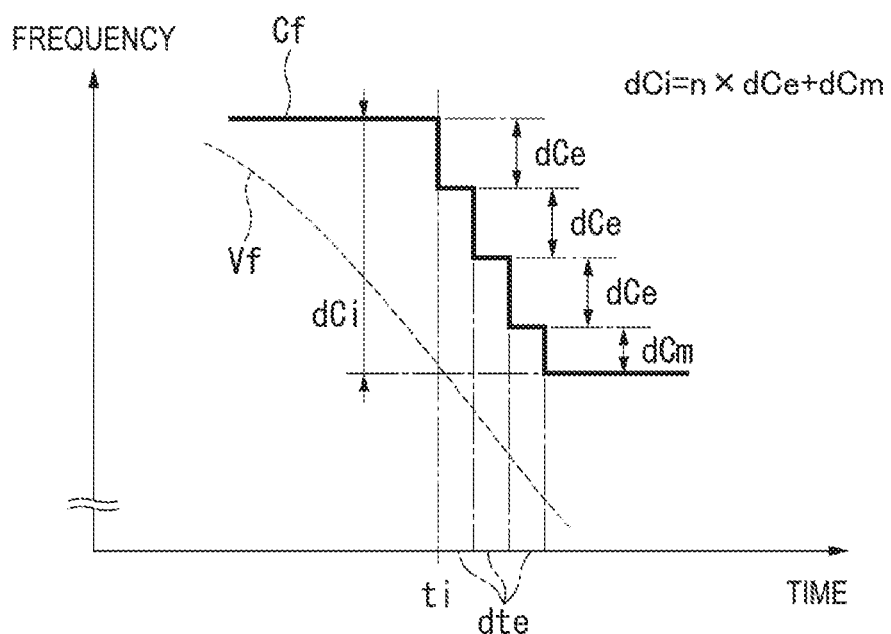
FIG. 11 is a graph showing a step-by-step processing by a resonance-lock delay controller in the exemplary embodiment.

FIG. 11 shows states in a step-by-step processing of the change of the drive signal Cf at the timing ti in Step S16 and Step S17.

At the timing ti, the resonance-lock controller 611 sets the change amount dCi of the drive signal Cf with reference to the oscillation states Vf (the above-described Step S13 shown in FIG. 8). When the change amount dCi is larger than the reference value dCe (the above-described Step S14 shown in FIG. 8), the resonance-lock delay controller 612 calculates the quotient n and the remainder dCm (the above-described Step S16 shown in FIG. 8), and step-by-step changes by the reference value dCe for n times and a step-by-step change by the remainder dCm for one time are sequentially executed at the time dte intervals.

As a result, the frequency change of the drive signal Cf at the timing ti reaches the change amount dCi(=n×dCe+dCm) that is preset by the resonance-lock controller 611.

Figure 12:
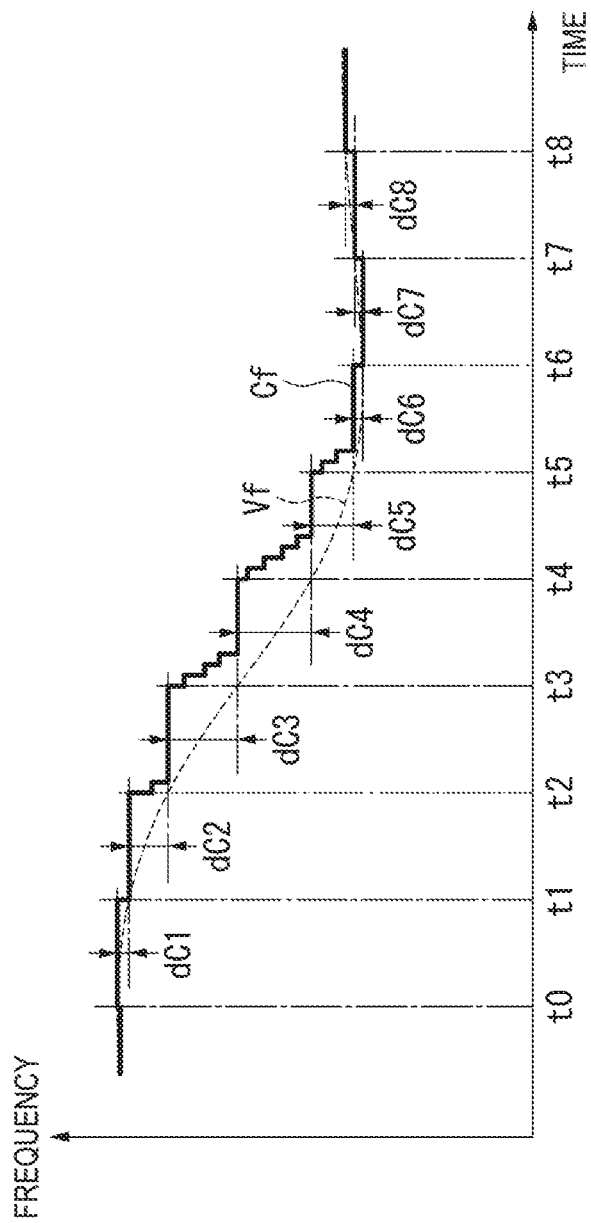
FIG. 12 is a graph showing a drive signal by the resonance lock operation in the exemplary embodiment.

FIG. 12 shows the drive signal Cf delayed in Steps S13 to S17 shown in FIG. 8.

Since the change amounts dC1 and dC6 to dC8 of the drive signal Cf at the respective timings t1 and t6 to t8 are smaller than the reference value dCe, the change of the drive signal Cf is executed by exactly the change amounts dC1, dC6 to dC8 according to Steps S13 to S15 shown in FIG. 8.

However, since the change amounts dC2 to dC5 at the timings t2 to t5 are larger than the reference value dCe, the change amounts dC2 to dC5 are converted to step-by-step changes in Steps S13 to S17 shown in FIG. 8. Specifically, the change amounts dC2 to dC5 are converted to two steps at the timing t2, four steps at the timing t3, five steps at the timing t4, and three steps at the timing t5. Consequently, the time reaching the change amounts dC2 to dC5 is delayed and the change amount at each step is restricted to less than the reference value dCe.

Advantage(s) of Exemplary Embodiment(s)

According to the above-described exemplary embodiment, advantages as follows are obtainable.

In the exemplary embodiment, the resonance-lock controller 611 allows the drive signal Cf to be automatically tuned to the peak of the current resonance frequency in the lens system 3 and efficiently create the standing wave.

At the execution of the resonance lock operation, the resonance-lock delay controller 612 delays the automatic tuning operated by the resonance-lock controller, in other words, the tuning to the resonance frequency, whereby the change in the frequency of the drive signal Cf is made slow. As a result, even when the change amount dCi in the frequency change by the resonance-lock is large, the change amount (=reference value dCr) of the actually executed frequency change is made small, which enables to prevent an inconsistency of image acquiring timings, image flickering in screen, and the like occurring at a large frequency change, so that a high-resolution image can be acquired.

Accordingly, even when the change amount dCi of the frequency change of the drive signal Cf operated by the resonance-lock controller 611 is large, an actually executed frequency change of the drive signal Cf is step-by-step changes by the reference value dCe. Accordingly, the inconsistency of image acquiring timings, image flickering in screen, and the like can reliably be prevented by setting the reference value dCe in accordance with the change amount falling within the range in which the inconsistency of image acquiring timings, image flickering in screen, and the like can be prevented.

In the exemplary embodiment, the change amount dCi is compared with the reference value dCe in Step S14. When the change amount dCi is equal to or smaller than the reference value dCe, the exact change amount dCi is used for the change in the drive signal Cf. When the change amount dCi is larger than the reference value dCe, a processing for the step-by-step changes defined in Steps S16 and S17 is conducted.

However, the processing of Steps S14 and S15 may be omitted. In this case, the quotient n=0 and the remainder dCm=dCi are determined in the division in Step S16 and, consequently, one-step change by the change amount dCi is executed.

It should be noted that, when the change amount dCi is smaller than the reference value dCe, the calculation in Steps S16 and S17 can be omitted by conducting Steps S14 and 15.

Other Exemplary Embodiment(s)

Figure 13:
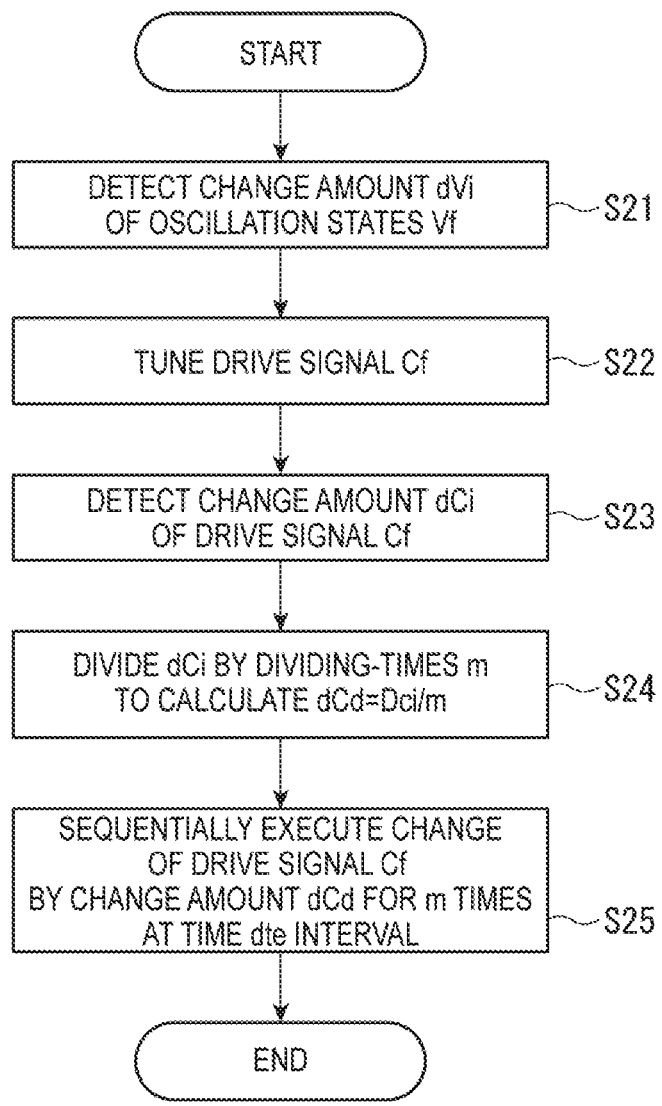
FIG. 13 is a flowchart showing a resonance lock operation in another exemplary embodiment of the invention.
Figure 14:
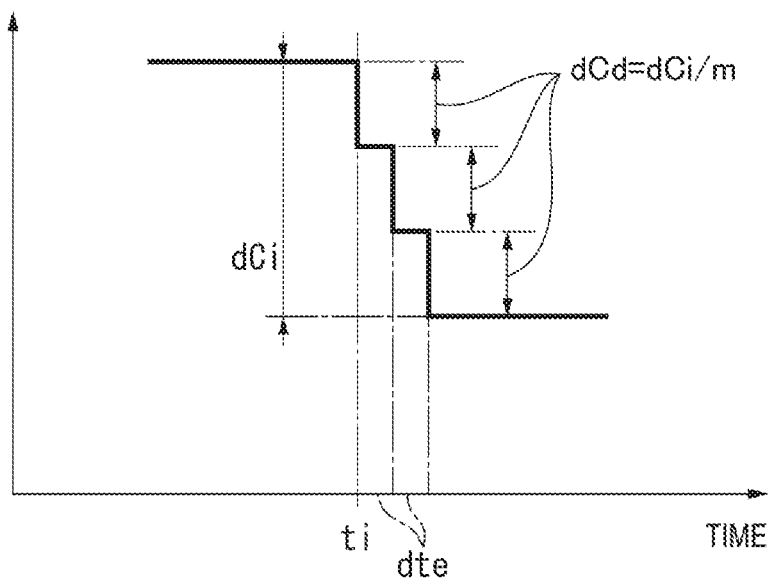
FIG. 14 is a graph showing a step-by-step processing by a resonance-lock delay controller in the another exemplary embodiment.

FIGS. 13 and 14 show another exemplary embodiment of the invention.

As described in FIGS. 8 to 12, the above-described exemplary embodiment employs the step-by-step changes using the reference value dCe and the quotient n and the remainder dCm obtained by the division.

However, in FIGS. 13 and 14, the number of the dividing times m is set in advance and the change amount dCi in the frequency change of the drive signal Cf is divided by the number of the dividing times m, thereby executing the step-by-step changes by the smaller change amount dCd (=dCi/m).

As shown in FIG. 13, the resonance-lock controller 611 refers to the oscillation states Vf and detects a change amount dVi (Step S21), and tunes the drive signal Cf to the change amount dVi (Step S22). Subsequently, the resonance-lock delay controller 612 detects the change amount dCi of the drive signal Cf set by the resonance-lock controller 611 (Step S23). Steps S21 to S23 are conducted in the same manner as in Steps S11 to S13.

After detecting the change amount dCi, the resonance-lock controller 612 divides the change amount dCi by the number of the dividing times m to calculate a step-by-step change amount dCd=dCi/m (Step S24).

Next, the change of the drive signal Cf at the timing ti is set to be sequentially executed by the change amount dCd for m times each at the time dte interval (Step S25).

FIG. 14 shows states in a step-by-step processing of the change of the drive signal Cf at the timing ti in Step S24 and Step S25.

At the timing ti, the resonance-lock controller 611 sets the change amount dCi of the drive signal Cf with reference to the oscillation states Vf (the above-described Step S23 in FIG. 13). The resonance-lock delay controller 612 calculates a step-by-step change amount dCd=dCi/m (the above-described Step S24 in FIG. 13). The step-by-step change by the change amount dCd is sequentially executed at a predetermined time dte interval for m times.

As a result, the frequency change of the drive signal Cf at the timing ti reaches the change amount dCi (=dCd×m) that is preset by the resonance-lock controller 611.

In the exemplary embodiment, the resonance-lock delay controller 612, in which the number of the dividing times m is set in advance, divides the change amount dCi of the frequency change of the drive signal Cf set by the resonance-lock controller 611 with the number of the dividing times m, and a plurality of frequency changes each by the the change amount dCd of the divided frequency is sequentially executed at the predetermined time dte interval. Accordingly, even at a large change amount dCi of the frequency change of the drive signal Cf set by the resonance-lock controller 611, an actually executed frequency change of the drive signal Cf is step-by-step changes by the number of the dividing times m, and a change amount dCd=dCi/m each at the time of change is made smaller than the entire change amount dCi of the frequency change of the original drive signal Cf. Accordingly, the inconsistency of the image acquiring timings, the image flickering in screen, and the like can reliably be prevented.

Further, since the number of the step-by-step changes made at the predetermined time dte interval is restricted by the the number of the dividing times m that is set in advance, even when the change amount dCi of the entire frequency change of the drive signal Cf is large, the frequency change always ends at a time dte×n, which enables to prevent prolongation of the time until the end of frequency change of the drive signal.

It should be understood that the scope of the invention is not limited to the above-described exemplary embodiment(s) but includes modifications and improvements compatible with the invention.

In the above exemplary embodiment, the resonance-lock delay controller 612 refers to the reference value dCe or the number of the dividing times m that are set in advance. However, in some embodiments, the reference value dCe or the number of the dividing times m is stored in the resonance-lock delay controller 612, another storage region set in the drive controller 61, or the controlling PC 7. Alternatively, a user inputs the reference value dCe or the number of the dividing times m through the controlling PC 7.

In the above exemplary embodiment, the resonance-lock operation unit 711 is provided to enable or disable the resonance-lock controller 611. However, in some embodiments, the resonance-lock operation unit 711 is omitted and the resonance-lock controller 611 constantly executes the resonance lock operation.

In the above exemplary embodiment, the lens controller 6 and the controlling PC 7 are combined in use in order to drive and control the lens system 3. However, in some embodiments, the lens controller 6 and the controlling PC 7 are integrated into a single device configured to drive, control and operate the lens system 3. However, the combination of the lens controller 6 and the controlling PC 7 as described in the above exemplary embodiment can provide an independent lens controller as a dedicated hardware for driving and controlling the lens system 3. Moreover, a general-purpose personal computer can be used for operating and adjusting the setting of the lens controller 6 and capturing the image.

In the above exemplary embodiment, the drive signal Cf and the focal-point-variation waveform Mf are in a form of a sine wave. However, in some embodiments, the drive signal Cf and the focal-point-variation waveform Mf are in other waveforms such as a such as triangular waveform, saw-tooth waveform, and rectangular waveform.

The specific structure of the lens system 3 is alterable as necessary. For instance, in some embodiments, the case 31 and the oscillator 32 are cylindrical, hexagonal or the like, and the dimension of the case 31 and the oscillator 32 and the nature of the liquid 35 are alterable as necessary.

What is claimed is:

1. A variable focal length lens device comprising:
    a lens system whose refractive index changes in response to a drive signal to be inputted;
    an objective lens disposed on the same optical axis as the lens system;
    an image detector configured to detect an image of a measurement target through the lens system and the objective lens;
    a resonance-lock controller configured to tune a frequency of the drive signal to a variable and temperature-dependent resonance frequency of the lens system; and
    a resonance-lock delay controller configured to delay a change in the frequency of the drive signal by the resonance-lock controller.

2. The variable focal length lens device according to claim 1, wherein
    the resonance-lock delay controller comprises a predetermined reference value that is set in advance and is configured to sequentially execute a plurality of frequency changes by the reference value at a predetermined time interval until the plurality of frequency changes reaches a frequency change of the drive signal controlled by the resonance-lock controller.

3. The variable focal length lens device according to claim 1, wherein
    the resonance-lock delay controller comprises a number of dividing times that is set in advance and is configured to divide the frequency change of the drive signal controlled by the resonance-lock controller by the number of dividing times, and sequentially execute the plurality of frequency changes by the divided frequency change of the drive signal at a predetermined time interval.

4. A variable focal length lens control method using a variable focal length lens device, the variable focal length lens device comprising:
- a lens system whose refractive index changes in response to a drive signal to be inputted;
- an objective lens disposed on the same optical axis as the lens system;
- an image detector configured to detect an image of a measurement target through the lens system and the objective lens; and
- a resonance-lock controller configured to tune a frequency of the drive signal to a variable and temperature-dependent resonance frequency of the lens system; the method comprising: converting a change in the frequency of the drive signal by the resonance-lock controller to a plurality of step-by-step changes.

5. The variable focal length lens device according to claim 1, wherein the drive signal is at least one of sinusoidal, triangular, saw-tooth, and rectangular waveforms.

6. The variable focal length lens device according to claim 4, wherein the drive signal is at least one of sinusoidal, triangular, saw-tooth, and rectangular waveforms.

* * * * *